(12) United States Patent
Butukuri et al.

(10) Patent No.: US 10,967,906 B1
(45) Date of Patent: Apr. 6, 2021

(54) IMPACT STRUCTURE

(71) Applicant: Zoox, Inc., Foster City, CA (US)

(72) Inventors: Ramanjaneya Reddy Butukuri, Union City, CA (US); Kevin Hothem, Redwood City, CA (US); Marcos Puerta Terron, Cheltenham (GB); Vishveshwar Ramanathan Subramanian, Palo Alto, CA (US); Thomas Andrew Stoddart, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 64 days.

(21) Appl. No.: 16/399,490

(22) Filed: Apr. 30, 2019

(51) Int. Cl.
*B62D 21/15* (2006.01)
*B62D 21/02* (2006.01)

(52) U.S. Cl.
CPC ........... *B62D 21/152* (2013.01); *B62D 21/02* (2013.01)

(58) Field of Classification Search
CPC ....... B62D 21/02; B62D 21/152; B62D 25/08
See application file for complete search history.

(56) References Cited

U.S. PATENT DOCUMENTS

| | | | |
|---|---|---|---|
| 2010/0026047 A1* | 2/2010 | Baccouche | B62D 21/152 296/187.09 |
| 2014/0239671 A1* | 8/2014 | Mori | B62D 21/152 296/187.09 |
| 2015/0151792 A1* | 6/2015 | Mori | F16F 7/12 296/187.09 |
| 2015/0314742 A1* | 11/2015 | Kato | B60R 19/34 293/155 |
| 2016/0362139 A1* | 12/2016 | Sekiguchi | B62D 25/082 |
| 2018/0065668 A1* | 3/2018 | Maier | B62D 21/152 |
| 2018/0201323 A1* | 7/2018 | Onoda | B62D 21/152 |
| 2018/0362087 A1* | 12/2018 | Kodama | B62D 21/02 |
| 2018/0362088 A1* | 12/2018 | Baccouche | C21D 1/673 |
| 2019/0016389 A1* | 1/2019 | Kamei | B62D 21/152 |
| 2019/0184804 A1* | 6/2019 | Shynn | B62D 21/152 |
| 2020/0070760 A1* | 3/2020 | Sotoyama | B60R 19/34 |
| 2020/0079432 A1* | 3/2020 | Watanabe | B62D 21/152 |
| 2020/0079434 A1* | 3/2020 | Enoki | B62D 25/082 |
| 2020/0140015 A1* | 5/2020 | Kondo | B62D 21/02 |
| 2020/0148271 A1* | 5/2020 | Kim | B62D 25/08 |
| 2020/0180699 A1* | 6/2020 | Hirose | B62D 21/15 |

* cited by examiner

*Primary Examiner* — Gregory A Blankenship
(74) *Attorney, Agent, or Firm* — Lee & Hayes, P.C.

(57) ABSTRACT

An impact structure includes a beam configured to deform in a particular manner. The beam may include a first deformable portion extending from a front end of the beam toward a rear end of the beam. The first deformable portion may be configured to axially crush in a direction substantially parallel to a longitudinal direction of the beam. The beam may also include a second deformable portion extending between the first deformable portion and the rear end. The beam may also include a reinforced section configured to cause the second deformable portion to bend. The first and second deformable portions may be configured such that an axial force acting on the front end in a direction substantially parallel to the longitudinal direction causes the first deformable portion to axially crush prior to causing the second deformable portion to bend.

20 Claims, 7 Drawing Sheets

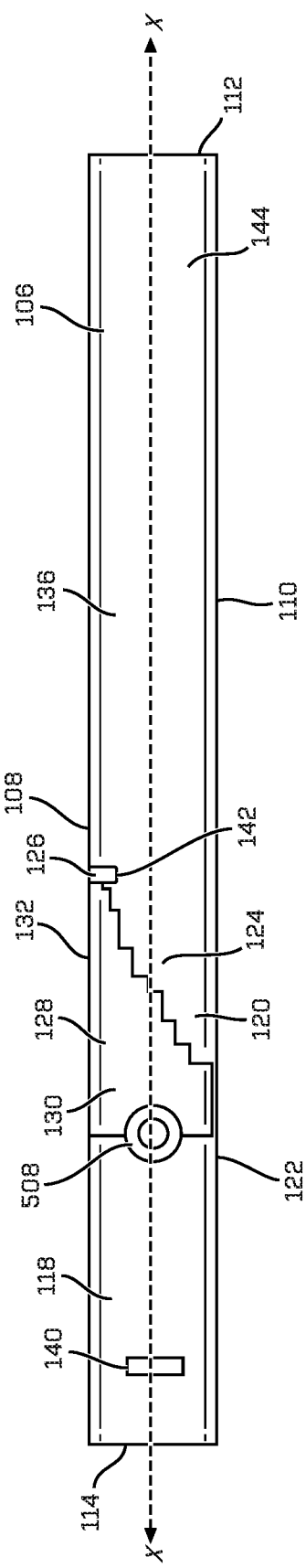
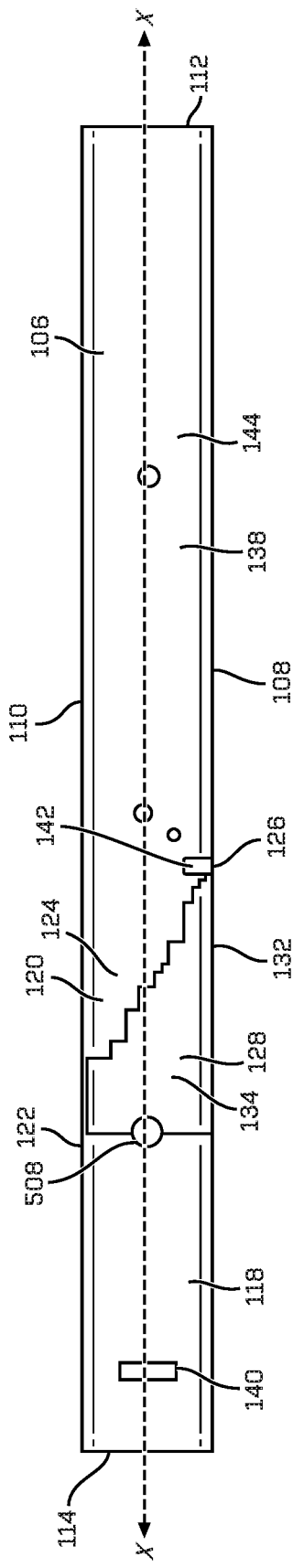
FIG. 6A
FIG. 6B

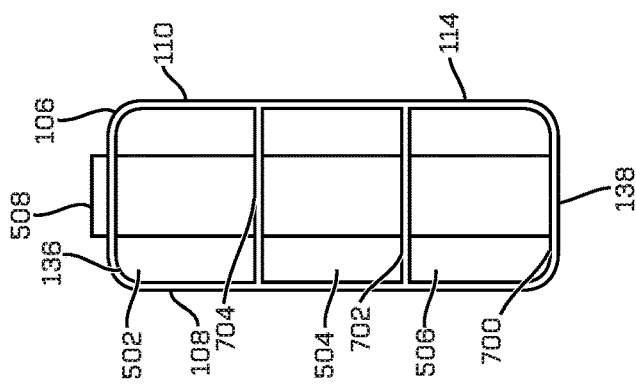
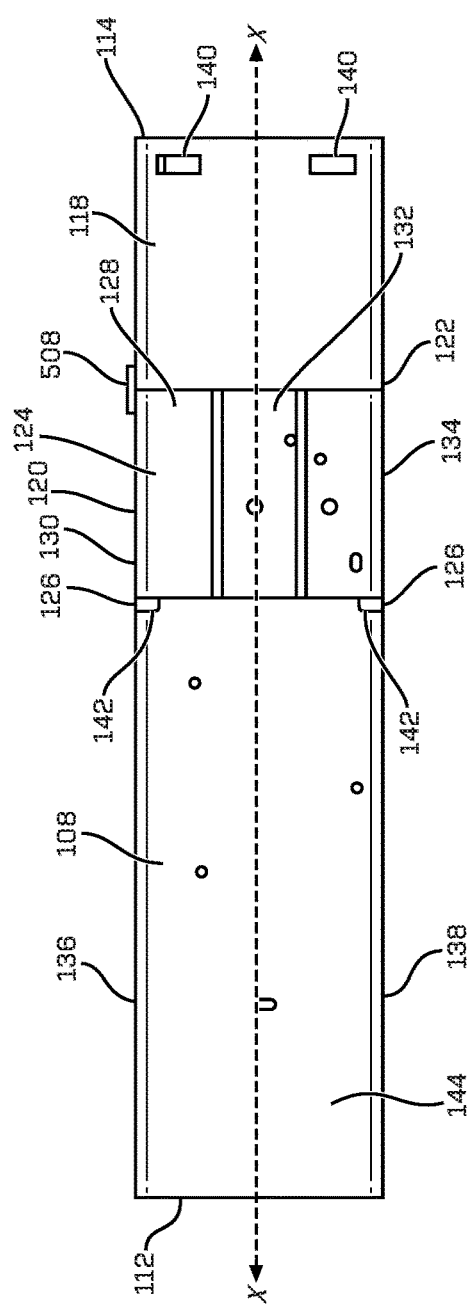
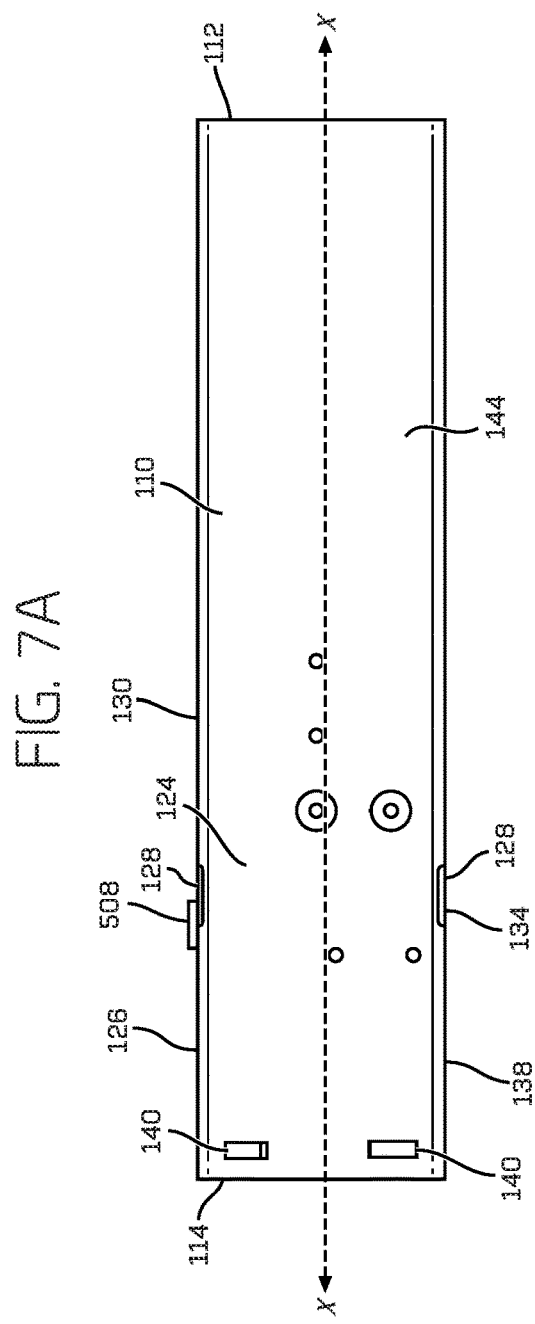

IMPACT STRUCTURE

BACKGROUND

During a vehicle collision, injuries to an occupant of the vehicle may result from the occupant contacting a surface inside the vehicle during the collision. As the difference between the speed of the occupant and the speed of the surface the occupant contacts increases, the force to which the occupant is subjected also increases, thereby increasing the likelihood or severity of injury to the occupant during the collision. Conventional seatbelts and airbags attempt to reduce the effects of collisions by preventing or reducing the likelihood of the occupant contacting an interior surface and/or reducing the difference between the speed of the occupant and the speed of any surface the occupant contacts. However, conventional seatbelts and airbags may not provide sufficient protection to an occupant during certain collision conditions.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

FIG. 6A is a top view of the example beam shown in FIG. 5A.

FIG. 6B is a bottom view of the example beam shown in FIG. 5A.

FIG. 7A is an inboard side view of the example beam shown in FIG. 5A.

FIG. 7B is an outboard side view of the example beam shown in FIG. 5A.

FIG. 7C is a front view of the example beam shown in FIG. 5A.

DETAILED DESCRIPTION

Figure 1:
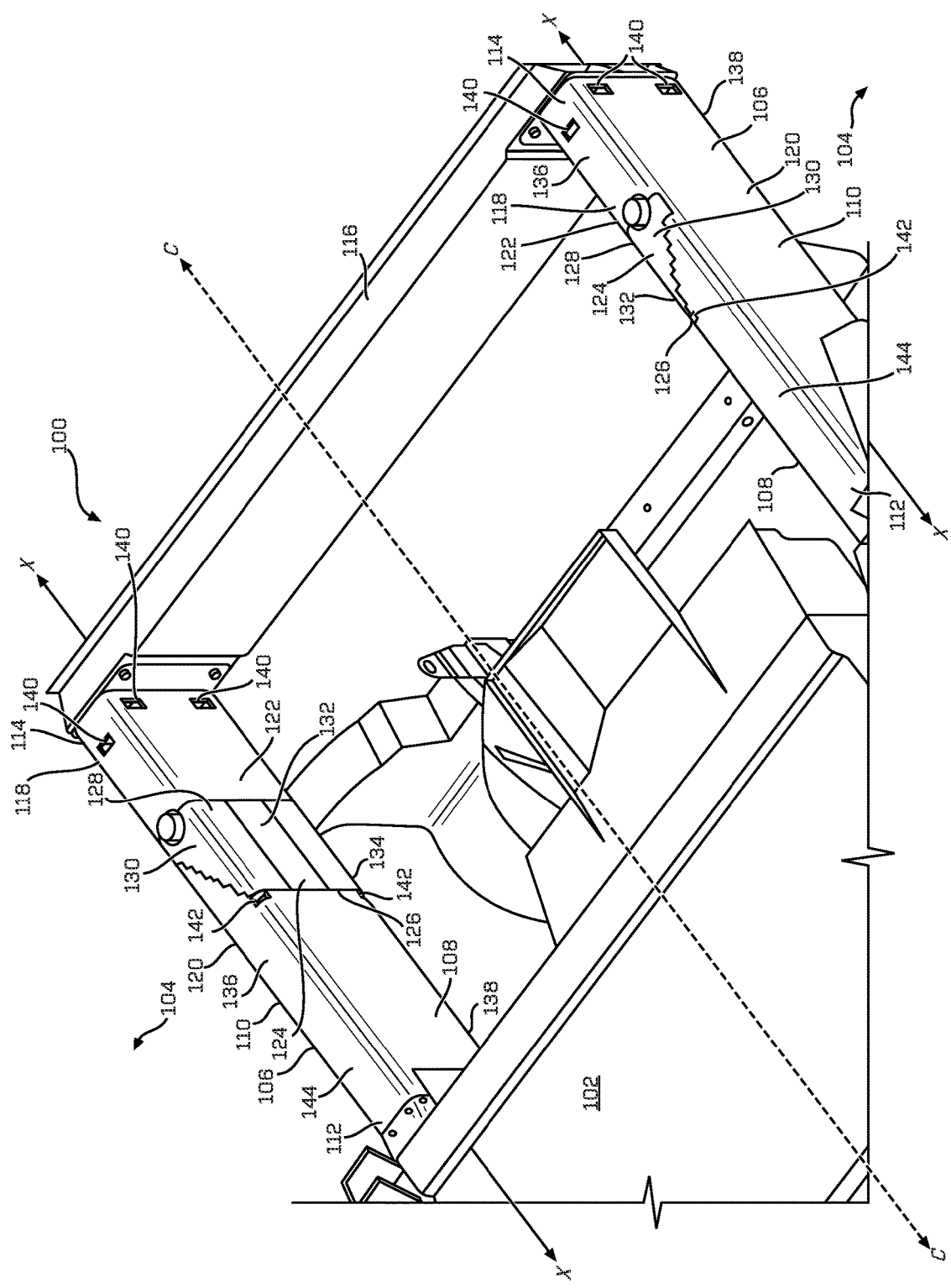
FIG. 1 is a perspective view of an example impact structure coupled to a portion of an example vehicle chassis.

As mentioned above, during a vehicle collision, injuries to an occupant of the vehicle may result from the occupant contacting a surface inside the vehicle during the collision. As a difference between the speed of the occupant and the speed of the surface the occupant contacts increases, the force to which the occupant is subjected also increases, thereby increasing the likelihood or severity of injuries to the occupant during the collision. Conventional seatbelts and airbags attempt to reduce the effects of collisions by preventing or reducing the likelihood of the occupant contacting an interior surface and/or reducing the difference between the speed of the occupant and the speed of any surface the occupant contacts. However, conventional seatbelts and airbags may not provide sufficient protection to an occupant during certain collision conditions.

For example, an occupant may be thrown forward against a seatbelt and/or an airbag by the force of the collision. As the difference between the speed of the occupant and the speed of seatbelt and/or airbag increases, so does the force of impact absorbed by the occupant, thereby increasing the likelihood or severity of injury to the occupant during the collision. When an occupant is seated facing the same direction as the direction of travel of the vehicle, and a collision occurs from behind the vehicle, for example, when another vehicle collides with a trailing end of the vehicle in which the occupant is traveling, the seat back of the seat in which the occupant is sitting may be propelled into the back of the occupant by the force of the collision. As the difference between the speed of the occupant and the speed of the seat back increases, so does the force of impact absorbed by the occupant, thereby increasing the likelihood or severity of injury to the occupant during the collision. In another example, when an occupant is seated facing a direction opposite the direction of travel of the vehicle and a collision occurs with the leading end of the vehicle, for example, when the leading end of the vehicle collides with another vehicle or object, the back of the occupant is thrown into the seat back of the seat in which the occupant is sitting. As the difference between the speed of the occupant and the speed of the seat back increases, so does the force of impact absorbed by the occupant, thereby increasing the likelihood or severity of injury to the occupant during the collision.

This disclosure is generally directed to impact structures configured to be coupled to a vehicle chassis to reduce the force of impact absorbed by the occupant during a collision. In some examples, the impact structure may include a beam configured to both partially axially crush in a longitudinal direction and thereafter bend, thereby transferring a first force to the vehicle chassis resulting from the axial crushing and a second relatively smaller force to the vehicle chassis and/or the occupant resulting from the bending.

In some examples, the impact structure may include a beam defining a rear end configured to be coupled to a vehicle chassis, a front end spaced from the rear end, and a longitudinal axis extending in a longitudinal direction between the rear end and the front end. The beam, according to some examples, may include a first deformable portion extending from the front end toward the rear end. In some examples, the first deformable portion may be configured to axially crush in a direction substantially parallel to the longitudinal direction. The beam may also include a second deformable portion extending from an intermediate point between the front end and the rear end toward the rear end. The beam, in some examples, may also include a reinforced section configured to cause the second deformable portion to bend. In some examples, the first deformable portion and the second deformable portion may be configured, such that an axial force acting on the front end in a direction substantially parallel to the longitudinal direction causes the first deformable portion to axially crush prior to causing the second deformable portion to bend. This configuration may result in the impact structure transferring a first force to the vehicle chassis as the first deformable portion axially crushes followed by transferring a second force to the vehicle chassis that is less than the first force. In some examples, this may result in the first force being transmitted to the vehicle chassis, during which the occupant may be safely secured or otherwise coupled to the vehicle chassis (e.g., via the seatbelt and/or the airbag, or the seatback). Thereafter, once the occupant is coupled to the vehicle chassis, the second force, in some instances being less than the first force, is transmitted to the vehicle chassis, thereby reducing a force pulse (or impulse) experienced by the occupant during the collision. In some examples, a length of the first deformable portion of the impact structure may be correlated to a length of time during which the first force is transmitted to the vehicle chassis, and the length of time may be tailored to reduce the effect of the collision on the occupant, for example, by associating the length time to a time for coupling the occupant to the vehicle chassis before commencing bending of the second deformable portion.

In some examples, the reinforced section may be configured to direct force associated with the axial force toward a bending point of the second deformable portion. For example, the reinforced section may include one or more of a sleeve at least partially extending around the beam or a reinforcement ridge. For example, the reinforced section may include a sleeve at least partially extending around the beam, wherein the sleeve is integrally formed with the second deformable portion or coupled to the second deformable portion via, for example, one or more of one or more adhesives (e.g., structural adhesive), welding, press-fitting, snap-fitting, one or more fasteners, or other means. In some examples, the reinforced section may extend substantially from the intermediate point to a bending point at which the second deformable portion bends. In some examples, the beam may include one or more triggers located at the bending point of the beam and configured to cause the beam to bend at the bending point, wherein the bending point is located between the intermediate point of the beam and the rear end of the beam. The one or more triggers may include any aperture and/or other structure configured to cause the beam to bend at the trigger, for example, prior to the beam bending at other positions along the length of the beam when an axial force is applied to the beam. For example, the one or more triggers may be an indentation, an aperture, a scoring, a crease, a thinned region, a groove, one or more shear pins or other shear members, etc. In some examples, the one or more triggers may be located at the bending point of the beam, and the reinforced section may extend substantially from the intermediate point to the bending point, for example, thereby promoting bending of the beam at the bending point.

In some examples, the beam may define an inboard side configured to face toward a centerline of the vehicle chassis and an outboard side opposite the inboard side and configured to face away from the centerline of the vehicle chassis. In some examples, the one or more triggers may be located at the inboard side of the beam and configured to cause the beam to bend at the bending point. In some such examples, when the beam bends, the portion of the beam that bends may deflect away from the centerline of the vehicle chassis, for example, toward a wheel well of the vehicle. This may result in providing relatively more clearance for the beam to deflect than if the beam were to deflect toward the centerline of the vehicle, which may lack sufficient space for deflection due to components of the vehicle.

In some examples, the first deformable portion may include one or more triggers located adjacent the front end of the beam and configured to cause the first deformable portion to axially crush upon application of an axial force acting on the front end in a direction substantially parallel to the longitudinal direction. For example, the one or more triggers of the first deformable portion may be on opposite sides of the beam (e.g., on both the inboard and outboard sides of the beam), thereby promoting the axial crushing of the first deformable portion in a direction substantially parallel to the longitudinal axis of the beam.

In some examples, the beam may include a third portion extending between the second deformable portion and the rear end of the beam. In some examples, the first deformable portion may have a first stiffness, and the third portion may have a second stiffness, wherein the second stiffness is greater than or equal to the first stiffness. This may promote, for example, the axial crushing of the first deformable portion and/or the bending of the second deformable portion while maintaining the structural integrity of the third portion (e.g., without axially crushing or bending the third portion).

In some examples, the beam may define one or more chambers extending longitudinally between the front end and the rear end of the beam. For example, the beam may include two, three, or more chambers extending longitudinally between the front end and rear end of the beam. In some examples, the beam may be formed via, for example, extrusion, and the chambers may be integrally formed during the extrusion process. In some examples, the beam may be formed by separately forming portions of the beam (e.g., each containing one or more chambers) and thereafter coupling the separately formed portions to one another via, for example, one or more adhesives (e.g., structural adhesive), welding, press-fitting, snap-fitting, one or more fasteners, or other means.

The techniques and systems described herein may be implemented in a number of ways. Example implementations are provided below with reference to the figures.

FIG. 1 is a perspective view of an example impact structure 100 coupled to a portion of an example vehicle chassis 102. The example vehicle chassis 102 defines a centerline C extending in a direction substantially parallel to a longitudinal axis of the vehicle chassis 102. In the example shown, the vehicle chassis 102 defines a pair of wheel wells 104 on opposite sides of the centerline C and configured to provide respective spaces, each for receipt of a wheel and tire (not shown). The vehicle associated with the vehicle chassis 102 may be a non-autonomous, semi-autonomous, or fully autonomous vehicle, and the portion of the vehicle chassis 102 may be either the front (or leading end) of the vehicle or the rear (or trailing end) of the vehicle.

In the example shown in FIG. 1, the impact structure 100 includes two beams 106, each coupled to the vehicle chassis 102 via, for example, one or more adhesives, welding, and/or one or more fasteners. Some examples of the impact structure 100 may include one beam 106 or more than two beams 106. In some examples, the beams 106 may differ from one another. As shown, the beams 106 are located on opposite sides of the centerline C of the vehicle chassis 102. The example beams 106 each define an inboard side 108 facing toward the centerline C and an outboard side 110 facing away from the centerline C. Each of the beams 106 defines a rear end 112 configured to be coupled to the vehicle chassis 102, a front end 114 spaced from the rear end 112, and a longitudinal axis X extending in a longitudinal direction between the rear end 112 and the front end 114. In some examples, for example as shown in FIG. 1, the impact structure 100 may include a cross member 116 coupled to the front ends 114 of each of the beams 106 via, for example, one or more adhesives, welding, and/or one or more fasteners. For example, as shown, the cross member 116 is coupled to respective end faces of the beams 106.

In the example shown in FIG. 1, each of the beams 106 includes a first deformable portion 118 extending from the front end 114 toward the rear end 112. As explained in more detail herein, the first deformable portion 118 may be configured to axially crush in a direction substantially parallel to the longitudinal axis X The beams 106 may also include a second deformable portion 120 extending from an intermediate point 122 between the front end 114 and the rear end 112 toward the rear end 112. In the example shown, the beams 106 also include a reinforced section 124 configured to cause the second deformable portion 120 to bend. In some examples, the first deformable portion 118 and the second deformable portion 120 may be configured, such that an axial force acting on the front end 114 in a direction substantially parallel to the longitudinal axis X causes the first deformable portion 118 to axially crush prior to causing the second deformable portion 120 to bend, for example, as described herein.

In some examples, the reinforced section 124 is configured to direct force associated with an axial force toward a bending point 126 of the second deformable portion 120. In the example shown, the reinforced section 124 includes a sleeve 128 partially extending around the beam 106. The example sleeve 128 includes an upper portion 130, a web portion 132, and a lower portion 134 coupled to the upper portion 130 via the web portion 132. In the example shown, the upper portion 130 is adjacent a top side 136 of the beam 106, the web portion 132 is adjacent the inboard side 108 of the beam 106, and the lower portion 134 is adjacent a bottom side 138 of the beam 106. The example sleeve 128 shown in FIG. 1 extends from the intermediate point 122 to the bending point 126 on the inboard side 108 of the beam 106. In the example shown, the upper portion 130 of the sleeve 128 is substantially triangular-shaped (e.g., similar to a right triangle), with one side of the triangle extending from the outboard side 110 of the beam 106 at the intermediate point 122 to the inboard side 108 of the beam at the bending point 126. In some examples, the one side may have a stair-stepped profile, for example, as shown, and in other examples, the one side may be substantially straight, although sides having other configurations are contemplated. In the example shown, the web portion 132 substantially covers the inboard side 108 of the beam 106 from the intermediate point 122 to the bending point 126. Although not visible in FIG. 1, the lower portion 134 of the sleeve 128, in some examples, is substantially a mirror-image of the upper portion 130 of the sleeve 128. The sleeve 128 may be formed integrally with the beam 106 or coupled to the beam 106 via, for example, one or more adhesives (e.g., structural adhesive), welding, press-fitting, snap-fitting, one or more fasteners, or other means. Other forms of the reinforced section 124 are contemplated, such as, for example, one or more ribs or ridges on the top side 136, the inboard side 108, and/or the bottom side 138 of the beam 106, either integrally formed with the beam 106 or coupled to the beam 106, that are configured to direct force associated with an axial force toward a bending point 126 of the second deformable portion 120.

In some examples, the beam 106 may be formed from aluminum, steel, titanium, any combination or alloy thereof, or any other suitable material(s) capable of axially crushing and/or bending. In some examples, the beam 106 may be integrally formed as a single piece, for example, via extrusion or molding, although in some such examples, the reinforced section 124 may be integrally formed or formed as a separate part, for example, as described above. In some examples, the first deformable portion 118 and the second deformable portion 120 may be formed as separate parts coupled to one another via, for example, one or more adhesives (e.g., structural adhesive), welding, press-fitting, snap-fitting, one or more fasteners, or other means. In some examples, the first deformable portion 118 and the second deformable portion 120 may be formed from different materials (or the same materials).

In some examples, for example, as shown in FIG. 1, the first deformable portion 118 of the beam 106 may include one or more triggers 140 configured to promote the axial crushing of the first deformable portion 118. For example, as shown, the example beams 106 include triggers 140 adjacent the front end 114 of the beam 106, including two triggers 140 on the inboard side 108 of the beam 106, two triggers 140 on the outboard side 110 of the beam 106, and one trigger 140 each on the top side 136 of the beam 106 and the bottom side 138 of the beam 106 (not viewable in FIG. 1). The triggers 140 may include a weakened portion of the beam 106, an indentation, an aperture (e.g., an oval-shaped aperture), a scoring, a crease, a thinned region, a groove, one or more shear pins or other shear members, etc. In some examples, the triggers 140 may have substantially the same structure. In some examples, the structure of the triggers 140 may differ from one another.

In some examples, for example as shown in FIG. 1, the beams 106 may include one or more triggers 142 located substantially at the bending point 126 of the beam 106 and configured to cause the beam 106 to bend at the bending point 126, which may be located between the intermediate point 122 of the beam 106 and the rear end 112 of the beam 106. For example, as shown in FIG. 1, the beam 106 includes two triggers 142 at the bending point 126 on the inboard side 108 of the beam 106, for example, with one of the two triggers 142 located at the transition between the inboard side 108 and the top side 136 of the beam 106 and the other of the two triggers 142 located at the transition between the inboard side 108 and the bottom side 138 of the beam 106. In combination with the reinforced section 124, which is configured to direct force toward the bending point 126 of the beam 106 (e.g., on the inboard side 108) and create a bending moment, the triggers 142 promote bending of the beam 106 at the bending point 126, such that a portion of the beam 106 between the intermediate point 122 and the bending point 126 deflects away from the centerline C of the vehicle chassis 102, for example, toward the adjacent wheel well 104. The triggers 142 may include a weakened portion of the beam 106, an indentation, an aperture (e.g., an oval-shaped aperture), a scoring, a crease, a thinned region, a groove, one or more shear pins or other shear members, etc. In some examples, the triggers 142 may have substantially the same structure. In some examples, the structure of the triggers 142 may differ from one another.

In some examples, for example as shown in FIG. 1, the beams 106 may include a third portion 144 extending between the second deformable portion 120 and the rear end 112 of the beam 106. For example, the third portion 144 may extend from the bending point 126 to the rear end 112 of the beam 106. In some examples, the first deformable portion 118 may have a first stiffness, and the third portion 144 may have a second stiffness, and in some examples, the second stiffness may be greater than or equal to the first stiffness. This may promote, for example, the axial crushing of the first deformable portion 118 and/or the bending of the second deformable portion 120 without axially crushing or bending the third portion 144. In some examples, the third portion may have a similar (or the same) cross-section transverse to the longitudinal axis X as the first deformable portion 118 and/or the second deformable portion 120.

Figure 2:
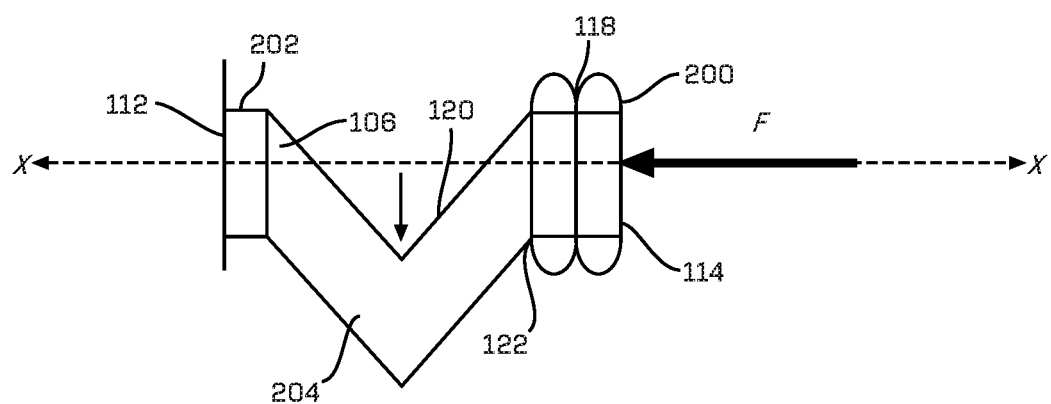
FIG. 2 is a schematic illustration of an example structure both axially crushing and bending in response to application of a force along a line parallel to a longitudinal axis of the structure.

FIG. 2 is a schematic illustration of an example beam 106 both axially crushing and bending in response to application of a force F along a line parallel to a longitudinal axis X of the example beam 106. The example beam 106 shown in FIG. 2 includes the first deformable portion 118 extending from a free end 200 (e.g., the front end 114) toward a fixed end 202 (e.g., the rear end 112). The example first deformable portion 118 is configured to axially crush in a direction substantially parallel to the longitudinal axis X The example beam 106 also includes the second deformable portion 120 extending from the intermediate point 122 between the free end 200 and the fixed end 202 toward the fixed end 202. As shown, the first deformable portion 118 crushes axially in a direction parallel to the longitudinal axis X, and the second deformable portion 120 bends such that a bent portion 204 of the beam deflects outward away from the longitudinal axis X In some examples, this may result in a two-stage deformation, for example, such that an axial force acting on the front end 114 of the beam 106 in a direction substantially parallel to the longitudinal X causes the first deformable portion 118 to axially crush (e.g., a first stage) prior to causing the second deformable portion 120 to bend (e.g., a second stage), for example, as described herein.

Figure 3:
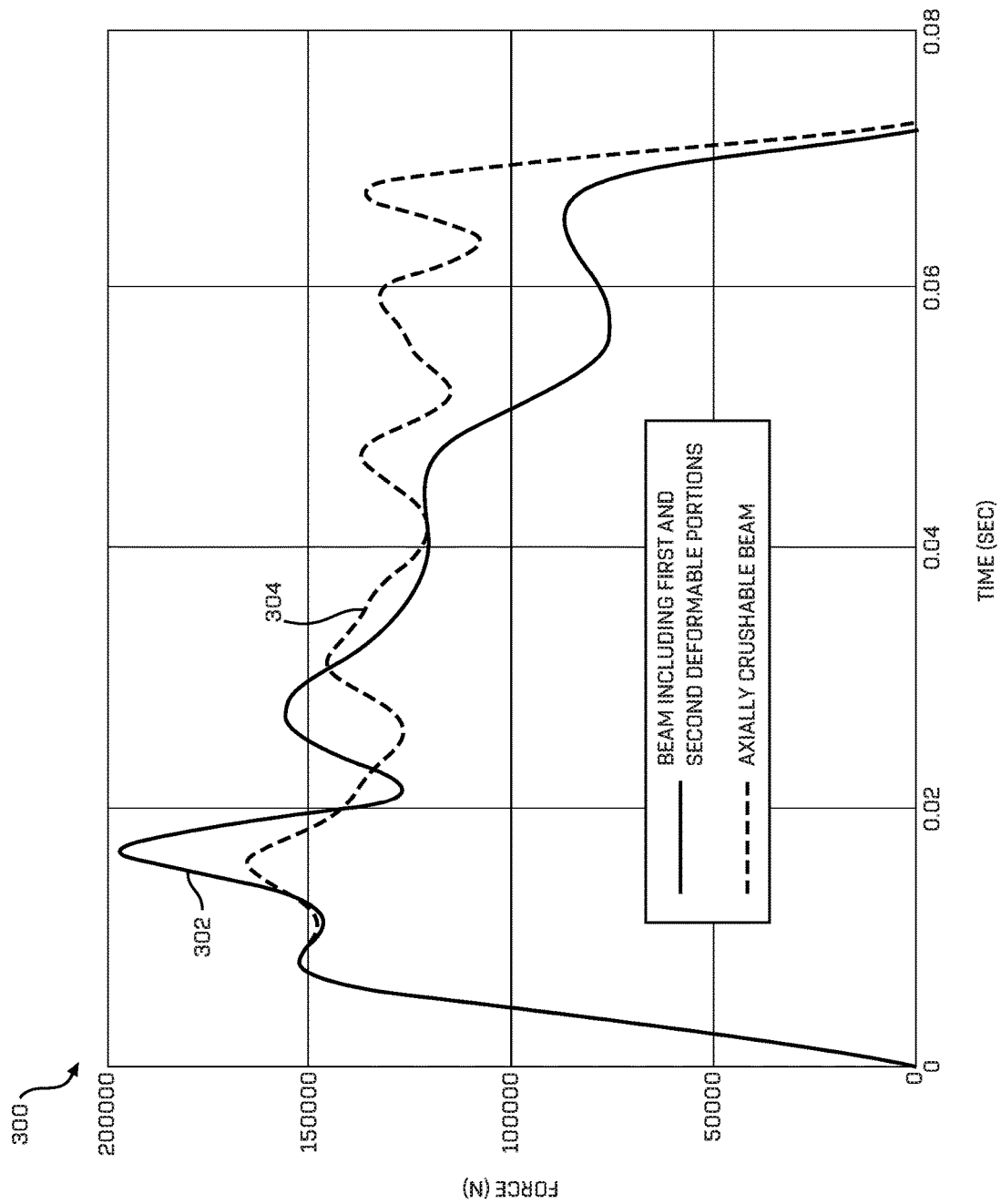
FIG. 3 is a graph of illustrating force (Newtons) transmitted to a test structure versus time (seconds) by (1) an example impact structure including a first deformable portion configured to crush axially and a second deformable portion configured to bend, and (2) an example structure configured to axially crush but not bend.

FIG. 3 is a graph 300 illustrating force (Newtons) transmitted to a test structure (e.g., a vehicle chassis) versus time (seconds) by (1) an example impact structure including a first deformable portion configured to crush axially and a second deformable portion configured to bend (represented by solid line 302 and which may correspond to the example beam 106 of the example impact structure 100), and (2) an example structure configured to axially crush but not bend (represented by dashed line 304). A comparison of the lines 302 and 304 shows that the structure configured to axially crush but not bend represented by line 304 initially transmits a force pulse at about 0.015 seconds of about 200,000 Newtons, followed by a cyclical transmission of force ranging between about 160,000 Newtons and 110,000 Newtons from about 0.015 seconds until about 0.075 seconds, at which point the transmission of the force ends. In contrast, the example impact structure configured to axially crush and thereafter bend represented by line 302 transmits force to the test structure in a similar manner until about 0.015 seconds, but thereafter has a force pulse between about 0.015 and 0.017 seconds, reaching about 190,000 Newtons. Thereafter, beginning at about 0.02 seconds, the transmission drops to about 130,000 Newtons, followed by a second force pulse at about 0.025 seconds of about 160,000 Newtons. Thereafter, however, the force transmitted to the test structure drops substantially relative to the structure denoted by the line 304 beginning at about 0.045 seconds until about 0.07 seconds, at which point the force transmitted is reduced to about 80,000 Newtons for the example impact structure denoted by line 302, as compared to 130,000 Newtons for the example structure denoted by the line 304. Thus, the example structure denoted by line 302 exhibits an initial force pulse between about 0.015 and 0.017 seconds, but thereafter, reduces the force transmitted to the test structure significantly relative to the example structure denoted by line 304.

In some examples, the first deformable portion 118 of the example beam 106 may be configured to axially crush during a first time period corresponding to the time shown in FIG. 3 up until about 0.015 to about 0.017 seconds, and thereafter the second deformable portion 120 may be configured to bend, for example, as described herein, during a second time period corresponding to the time shown up until about 0.07 seconds, at which time transfer of the force to the test structure ends. The first time period may, in some examples, correspond to a time during which an occupant of a vehicle is coupled to the vehicle during axial crushing of the first deformable portion 118, for example, as described herein, after which a relatively reduced amount of force is transmitted to the occupant as the second deformable portion 120 bends.

In some examples, the first deformable portion 118 and the second deformable portion 120 may be configured such that a first force is transmitted to the vehicle chassis 102 by the first deformable portion 118 axially crushing and a second force is transmitted to the vehicle chassis 102 by the second deformable portion 120 bending, for example, as described herein. In some such examples, the first force may be greater than the second force, for example, similar to the example impact structure of FIG. 3 denoted by line 302. In some examples, the first deformable portion 118 and the second deformable portion 120 meet at a transition point (e.g., the intermediate point 122) located a transition distance from the front end 114 of the beam 106, and in some examples, the transition distance may be correlated to a transition time, the duration of which extends from an initial time coinciding with an initiation of application of the axial force to the beam 106 to a bending time at which bending of the second deformable portion 120 commences. In some examples, the transition distance may be configured to coincide with a coupling time at which an occupant of the vehicle chassis 102 is coupled to the vehicle chassis 102 during a collision, and after which, the second deformable portion 120 bends. In some examples, the transition distance may be dependent on the speed of the vehicle at the point of collision. For example, the transition distance may be determined for a predetermined speed of collision (e.g., 35 miles per hour), for example, based on parameters associated with traffic safety regulations. For example, for a given speed of collision, the transition distance may be calculated to correspond to a distance through which the first deformable portion 118 crushes axially, which, in turn, may correspond to a transition time, the duration of which extends from an initial time coinciding with an initiation of the collision to a bending time at which bending of the second deformable portion 120 commences. In some examples, the transition time may be configured to coincide with a coupling time at which an occupant of the vehicle chassis 102 is coupled to the vehicle chassis 102 during the collision, and after which, the second deformable portion 120 bends.

For example, some examples of the impact structure 100 and/or the beam 106 may be configured to increase an initial force pulse magnitude (impulse) while the first deformable portion 118 axially crushes, and thereafter, reduce the force pulse magnitude (impulse) while the second deformable portion 120 bends. Thus, relative to a beam that deforms primarily only due to axial crushing, for example, as depicted by the line 304 in FIG. 3, some examples of the beam 106 may absorb a greater percentage of the total energy of the collision (e.g., as represented by the total area under the curves 302 and 304, respectively) more quickly during the axial crushing of the first deformable portion 118 of the beam 106. This is represented by the portion of the curve 302 being higher than the corresponding portion of the curve 304, for example, up until about 0.04 seconds in the examples shown in FIG. 3. Thereafter, once the second deformable portion 120 of the beam 106 begins to bend, relatively less of the total energy of the collision is absorbed than the corresponding portion of the curve 304, for example, from about 0.04 seconds up until the transfer of force to the vehicle chassis 102 from the collision ends. This is represented by the portion of the curve 302 being lower than the corresponding portion of the curve 304, for example, from about 0.04 seconds up until the transfer of force to the vehicle chassis 102 from the collision ends in the examples shown. This may enable a relative shortening of the impact structure 100 and/or the beam 106, while substantially maintaining the effectiveness of the impact structure 100 and/or the beam 106 with respect to the occupant. This may be useful, for example, in configuring an impact structure 100 for a vehicle having a relatively short overhang (e.g., a distance between a centerline of a vehicle wheel and a respective end of the vehicle), which may provide design options for the vehicle. Other uses for the example impact structure 100 and/or the beam 106 are contemplated.

Figure 4:
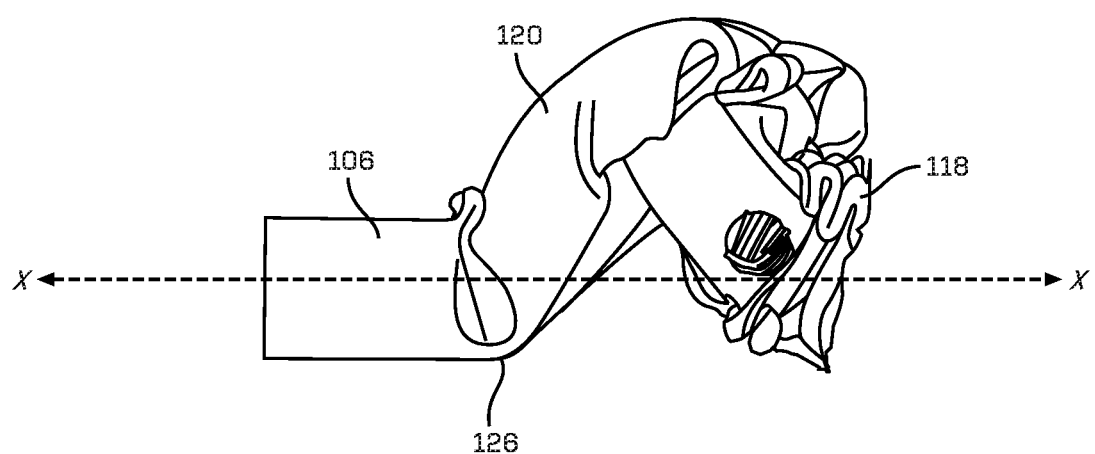
FIG. 4 is a schematic top view of an example beam including a first deformable portion configured to crush axially and a second deformable portion configured to bend in response to application of an axial force along a line substantially parallel to a longitudinal axis of the beam.

FIG. 4 is a schematic top view of an example beam 106 including a first deformable portion 118 configured to crush axially and a second deformable portion 120 configured to bend in response to application of an axial force along a line substantially parallel to a longitudinal axis X of the beam 106. As shown in FIG. 4, the first deformable portion 118 has axially crushed, and the second deformable portion 120 has bent at a bending point 126. The beam 106 shown in FIG. 4, in some examples, may exhibit a response to the axial force at least similar to the response denoted by line 302 in FIG. 3.

Figure 5A:
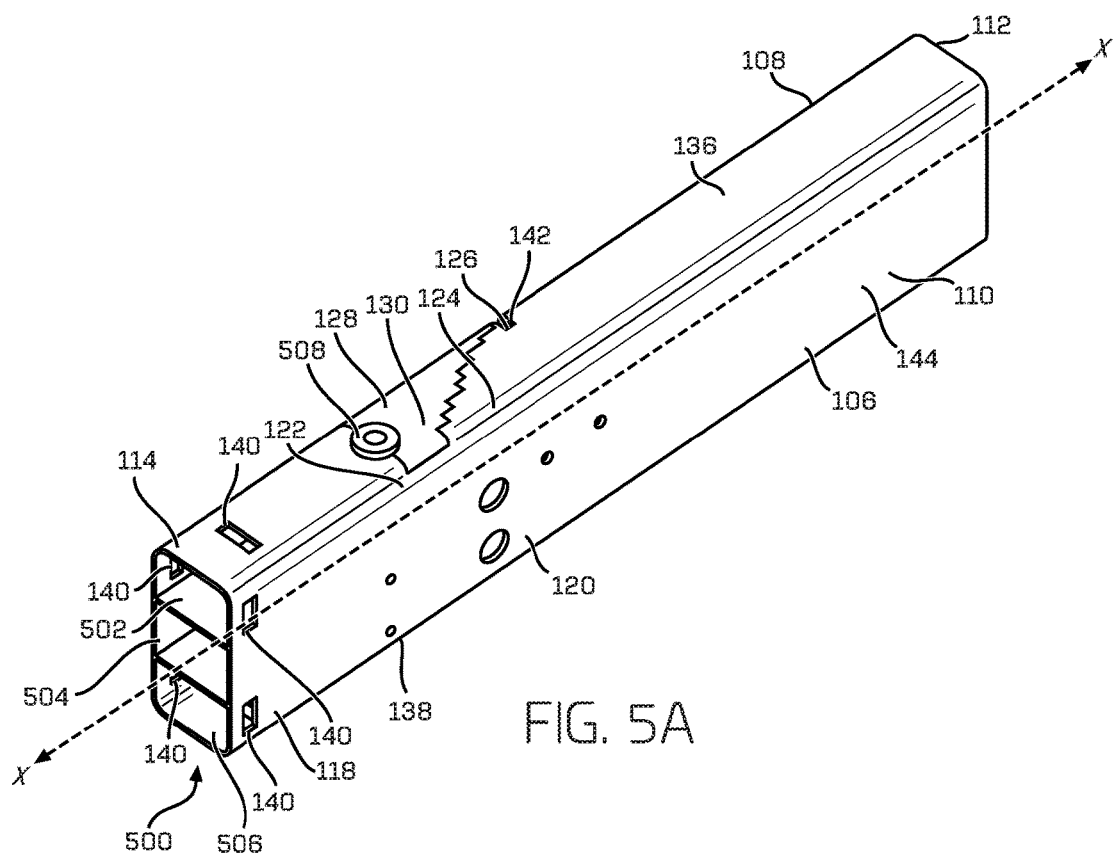
FIG. 5A is a perspective view of an example beam illustrating a top side, a front end, and an outboard side of the example beam.

FIG. 5A is a perspective view of an example beam 106 illustrating the top side 136, the front end 114, and an outboard side 110 of the example beam 106. In some examples, the beam 106 may define one or more chambers 500 extending longitudinally (partially or fully) between the front end 114 and the rear end 112 of the beam 106. For example, the beam 106 shown in FIGS. 5A and 5B includes three chambers 500, including an upper chamber 502, a middle chamber 504, and a lower chamber 506. Other numbers, shapes, and/or relative arrangements of chambers 500 are contemplated. In some examples, a cross-section of the beam 106 transverse to the longitudinal axis X may be constant along the length of the beam 106, and in some examples, the cross-section may vary along the length of the beam 106. Although the cross-section of the example beam 106 is rectangular, other cross-sectional shapes are contemplated.

For example, the beam 106 may be configured based on parameters, such as, for example, the moment of inertia of the cross-section of the beam 106, which may depend on the cross-sectional size and/or cross-sectional shape of the beam, the number of chambers 500, wall thickness, and/or the configuration of the chambers 500, etc. of the beam 106, and/or the characteristics of the material(s) from which the beam 106 is made. In some examples, one or more of these parameters may be adjusted and/or selected to provide a beam 106 having a desired strength against buckling and/or a desired crush strength. In some examples, known buckling-related equations may be used to adjust and/or select one or more of the parameters. In some such examples, the end characteristics for such equations(s) may include one or more of a fixed end condition or a free end condition. The example beam 106 shown may result in a desired combination of buckling strength, axial crush strength, and/or length, for example, to provide a desired transition time, for example, as described herein.

Figure 5B:
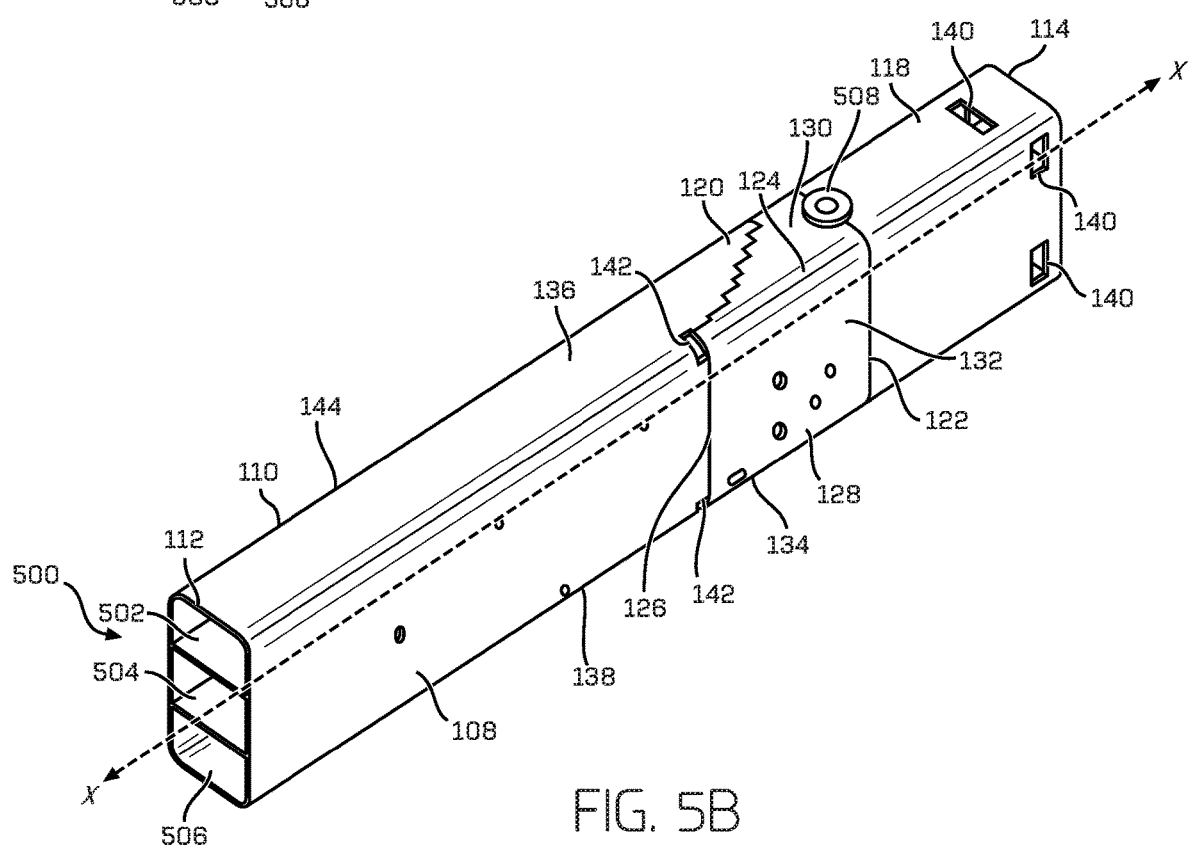
FIG. 5B is a perspective view of the example beam shown in FIG. 5A illustrating the top side, a rear end, and an inboard side of the example beam.

FIG. 5B is a perspective view of the example beam 106 shown in FIG. 5A illustrating the top side 136, the rear end 112, and the inboard side 108 of the example beam 106. As shown in FIGS. 5A and 5B, some examples of the beam 106 may include one or more apertures, for example, in the top side 136, the bottom side 138, the inboard side 108, and/or the outboard side 110, each configured to accommodate a fastener (not shown), for example a bolt, for securing other structures to the beam 106. For example, the example beam 106 shown includes opposing apertures in the top side 136 and the bottom side 138, and in some examples, the beam 106 may include fastener sleeve 508 extending between the apertures to protect the beam 106 from damage due to a fastener.

FIG. 6A is a top view of the example beam 106 shown in FIG. 5A, and FIG. 6B is a bottom view of the example beam shown in FIG. 5A. As shown in FIGS. 6A and 6B, the example sleeve 128 has upper and lower portions 130 and 134 that are substantially mirror images of one another, for example, as described previously herein with respect to FIG. 1. In some examples, the upper and lower portions 130 and 134 are not mirror images of one another. Although the upper and lower portions 130 and 134 are substantially triangular-shaped, other shapes are contemplated.

FIG. 7A is an inboard side view of the example beam 106 shown in FIG. 5A illustrating the example inboard side 108 of the beam 106, and FIG. 7B is an outboard side view illustrating the example outboard side 110 of the example beam 106 shown in FIG. 5A. As shown in FIGS. 7A and 7B, the example sleeve 128 does not include a portion extending onto or across the outboard side 110 of the beam 106. This permits the second deformable portion 120 of the beam 106 to bend substantially freely at the outboard side 110, while the web portion 132 of the sleeve 128 supports the inboard side 108 of the beam 106. This example configuration may result in the second deformable portion 120 deflecting away from the centerline C of the vehicle chassis 102, for example, as described with respect to FIG. 1. Other configurations of the sleeve 128 are contemplated.

FIG. 7C is a front view of the example beam 106 illustrating an example cross-section transverse to the longitudinal axis X of the beam 106 at the front end 114 of the beam 106. As shown in FIG. 7C, the example fastener sleeve 508 extends from an inner surface 700 of the bottom side 138 of the beam 106 (e.g., inside the lower chamber 506) through an aperture in a web 702 separating the lower chamber 506 from the middle chamber 504, through the middle chamber 504, through an aperture in a web 704 separating the middle chamber 504 from the upper chamber 502, and through the upper chamber 502 and the top side 136 of the beam 106. In some examples, the fastener sleeve 508 may include a tubular cylinder. Other configurations are contemplated. The fastener sleeve 508 may serve to protect the beam 106 from a fastener used to couple another structure of the vehicle to the beam 106, for example, by preventing the beam 106 from being partially crushed as the fastener is being tightened.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

Example Clauses

A. An example vehicle comprising:
an impact structure comprising a beam defining a first end, a second end spaced from the first end, and a longitudinal axis extending in a longitudinal direction between the first end and the second end, the beam comprising:
a first deformable portion extending from the first end toward the second end, the first deformable portion configured to axially crush in a direction substantially parallel to the longitudinal direction;
a second deformable portion extending from an intermediate point between the first end and the second end toward the second end; and
a reinforced section configured to cause the second deformable portion to bend,
wherein the first deformable portion and the second deformable portion are configured, such that an axial force acting on the first end in a direction substantially parallel to the longitudinal direction causes the first deformable portion to axially crush and the second deformable portion to bend.

B. The vehicle of example A, wherein the reinforced section is configured to direct force associated with the axial force toward a bending point of the second deformable portion.

C. The vehicle of example A or example B, wherein the beam further comprises a trigger located at the bending point of the beam and configured to cause the beam to bend at the bending point.

D. The vehicle of any one of example A through example C, wherein the reinforced section comprises at least one of a sleeve at least partially extending around the beam or a reinforcement ridge.

E. The vehicle of any one of example A through example D, wherein the beam comprises a first beam, and the vehicle further comprises a second beam defining a first end of the second beam, a second end of the second beam spaced from the first end of the second beam, and a longitudinal axis of the second beam extending in a longitudinal direction between the first end of the second beam and the second end of the second beam, the second beam comprising:
a first deformable portion extending from the first end of the second beam toward the second end of the second beam, the first deformable portion of the second beam configured to axially crush in a direction substantially parallel to the longitudinal direction of the second beam;
a second deformable portion extending from an intermediate point of the second beam between the first end of the second beam and the second end of the second beam toward the second end of the second beam; and
a reinforced section configured to cause the second deformable portion of the second beam to bend.

F. The vehicle of any one of example A through example E, wherein the first deformable portion and the second deformable portion are configured such that a first force is transmitted to a vehicle chassis during axial crushing of the first deformable portion and a second force is transmitted to the vehicle chassis during bending of the second deformable portion, and wherein the first force is greater than the second force.

G. The vehicle of any one of example A through example F, wherein the first deformable portion and the second deformable portion meet at the intermediate point, the intermediate point located a transition distance from the first end of the beam, wherein the transition distance is based at least in part on a transition time to axially crush the first portion.

H. The vehicle of any one of example A through example G, wherein the transition time is configured to coincide with a coupling time at which an occupant of the vehicle chassis is coupled to the vehicle chassis during a collision.

I. An example impact structure for a vehicle comprising:
a beam comprising:
a first deformable portion extending from a first end of the beam toward a second end of the beam along a longitudinal direction, the first deformable portion configured to axially crush in a direction substantially parallel to the longitudinal direction;
a second deformable portion extending from an intermediate point between the first end and the second end; and
a reinforced section configured to cause the second deformable portion to bend.

J. The impact structure of example I, wherein the first deformable portion and the second deformable portion are configured such that a first force is to be transmitted to a vehicle chassis during axial crushing of the first deformable portion and a second force is to be transmitted to the vehicle chassis during bending of the second deformable portion, and wherein the first force is greater than the second force.

K. The impact structure of example I or example J, wherein the beam defines:
an inboard side; and
a trigger located at the inboard side of the beam and configured to cause the beam to bend in a direction opposite the inboard side at a bending point, the bending point located between the intermediate point of the beam and the rear end of the beam.

L. The impact structure of any one of example I through example K, wherein the reinforced section extends substantially from the intermediate point to a bending point at which the second deformable portion bends.

M. The impact structure of any one of example I through example L, wherein:
the beam comprises a trigger located at a bending point of the beam and configured to cause the beam to bend at the bending point; and
the reinforced section extends substantially from the intermediate point to the bending point.

N. The impact structure of any one of example I through example M, wherein:
the beam comprises a third portion extending between the second deformable portion and the second end;
the first deformable portion has a first stiffness and the third portion has a second stiffness; and
the second stiffness is greater than or equal to the first stiffness.

O. The impact structure of any one of example I through example N, wherein the beam defines a plurality of chambers extending longitudinally between the first end and the second end.

P. The impact structure of any one of example I through example O, wherein the first deformable portion and the second deformable portion are configured such that an axial force acting on the first end in a direction substantially parallel to the longitudinal direction causes the first deformable portion to axially crush prior to causing the second deformable portion to bend.

Q. An example impact structure for a vehicle comprising:
a first deformable portion extending from a first end toward a second end along a longitudinal direction, the first deformable portion configured to axially crush in a direction substantially parallel to the longitudinal direction;
a second deformable portion extending from an intermediate point between the first end and the second end; and a reinforced section configured to cause the second deformable portion to bend, wherein the first deformable portion and the second deformable portion meet at an intermediate point located a transition distance from the first end, wherein the transition distance is based at least in part on a transition time comprising an amount of time to axially crush the first deformable portion.

R. The impact structure of example Q, wherein the transition time is configured to coincide with a coupling time at which an occupant of a vehicle chassis is coupled to the vehicle chassis during a collision.

S. The impact structure of example Q or example R, wherein:

the impact structure comprises a beam;

the reinforced section extends substantially from the intermediate point to a bending point at which the second deformable portion bends; and the beam defines:

an inboard side configured to face toward a centerline of a vehicle chassis; and a trigger located at the inboard side of the beam at the bending point and configured to cause the beam to bend at the bending point, the bending point located between the intermediate point of the beam and the second end of the beam.

T. The impact structure of any one of example Q through example S, wherein the impact structure defines a plurality of chambers extending longitudinally between the first end and the second end, and wherein the reinforced section comprises at least one of a sleeve at least partially extending around the impact structure or a reinforcement ridge.

U. The impact structure of any one of example Q through example T, wherein the first deformable portion comprises a trigger located adjacent the first end and configured to cause the first deformable portion to axially crush upon application of an axial force acting on the first end in a direction substantially parallel to the longitudinal direction.

What is claimed is:

1. A vehicle comprising:
   an impact structure comprising a beam defining a first end, a second end spaced from the first end, and a longitudinal axis extending in a longitudinal direction between the first end and the second end, the beam comprising:
   a first deformable portion extending from the first end toward the second end, the first deformable portion configured to axially crush in a direction substantially parallel to the longitudinal direction;
   a second deformable portion extending from an intermediate point between the first end and the second end toward the second end; and
   a reinforced section proximate the intermediate point and between the first end and the second end, the reinforced section configured to cause the second deformable portion to bend,
   wherein the first deformable portion and the second deformable portion are configured, such that an axial force acting on the first end in a direction substantially parallel to the longitudinal direction causes the first deformable portion to axially crush and the second deformable portion to bend.

2. The vehicle of claim 1, wherein the reinforced section is configured to direct force associated with the axial force toward a bending point of the second deformable portion.

3. The vehicle of claim 2, wherein the beam further comprises a trigger located at the bending point of the beam and configured to cause the beam to bend at the bending point.

4. The vehicle of claim 1, wherein the reinforced section comprises at least one of a sleeve at least partially extending around the beam or a reinforcement ridge.

5. The vehicle of claim 1, wherein the beam comprises a first beam, and the vehicle further comprises a second beam defining a first end of the second beam, a second end of the second beam spaced from the first end of the second beam, and a longitudinal axis of the second beam extending in a longitudinal direction between the first end of the second beam and the second end of the second beam, the second beam comprising:
   a first deformable portion extending from the first end of the second beam toward the second end of the second beam, the first deformable portion of the second beam configured to axially crush in a direction substantially parallel to the longitudinal direction of the second beam;
   a second deformable portion extending from an intermediate point of the second beam between the first end of the second beam and the second end of the second beam toward the second end of the second beam; and
   a reinforced section configured to cause the second deformable portion of the second beam to bend.

6. The vehicle of claim 1, wherein the first deformable portion and the second deformable portion are configured such that a first force is transmitted to a vehicle chassis during axial crushing of the first deformable portion and a second force is transmitted to the vehicle chassis during bending of the second deformable portion, and wherein the first force is greater than the second force.

7. The vehicle of claim 1, wherein the first deformable portion and the second deformable portion meet at the intermediate point, the intermediate point located a transition distance from the first end of the beam, wherein the transition distance is based at least in part on a transition time to axially crush the first portion.

8. The vehicle of claim 7, wherein the transition time is configured to coincide with a coupling time at which an occupant of the vehicle chassis is coupled to the vehicle chassis during a collision.

9. An impact structure for a vehicle comprising:
   a beam comprising:
   a first deformable portion extending from a first end of the beam toward a second end of the beam along a longitudinal direction, the first deformable portion configured to axially crush in a direction substantially parallel to the longitudinal direction;
   a second deformable portion extending from an intermediate point between the first end and the second end; and
   a reinforced section proximate the intermediate point and between the first end and the second end, the reinforced section configured to cause the second deformable portion to bend.

10. The impact structure of claim 9, wherein the first deformable portion and the second deformable portion are configured such that a first force is to be transmitted to a vehicle chassis during axial crushing of the first deformable portion and a second force is to be transmitted to the vehicle chassis during bending of the second deformable portion, and wherein the first force is greater than the second force.

11. The impact structure of claim 9, wherein the beam defines:

an inboard side; and a trigger located at the inboard side of the beam and configured to cause the beam to bend in a direction opposite the inboard side at a bending point, the bending point located between the intermediate point of the beam and the rear end of the beam.

12. The impact structure of claim 9, wherein the reinforced section extends substantially from the intermediate point to a bending point at which the second deformable portion bends.

13. The impact structure of claim 9, wherein:

the beam comprises a trigger located at a bending point of the beam and configured to cause the beam to bend at the bending point; and the reinforced section extends substantially from the intermediate point to the bending point.

14. The impact structure of claim 9, wherein:

the beam comprises a third portion extending between the second deformable portion and the second end;

the first deformable portion has a first stiffness and the third portion has a second stiffness; and the second stiffness is greater than or equal to the first stiffness.

15. The impact structure of claim 9, wherein the beam defines a plurality of chambers extending longitudinally between the first end and the second end.

16. The impact structure of claim 9, wherein the first deformable portion and the second deformable portion are configured such that an axial force acting on the first end in a direction substantially parallel to the longitudinal direction causes the first deformable portion to axially crush prior to causing the second deformable portion to bend.

17. An impact structure for a vehicle comprising:

a first deformable portion extending from a first end toward a second end along a longitudinal direction, the first deformable portion configured to axially crush in a direction substantially parallel to the longitudinal direction;

a second deformable portion extending from an intermediate point between the first end and the second end; and a reinforced section configured to cause the second deformable portion to bend, wherein the first deformable portion and the second deformable portion meet at the intermediate point, the intermediate point is located a transition distance from the first end and the transition distance is based at least in part on a transition time comprising an amount of time to axially crush the first deformable portion.

18. The impact structure of claim 17, wherein the transition time is configured to coincide with a coupling time at which an occupant of a vehicle chassis is coupled to the vehicle chassis during a collision.

19. The impact structure of claim 17, wherein:

the impact structure comprises a beam;

the reinforced section extends substantially from the intermediate point to a bending point at which the second deformable portion bends; and the beam defines:

an inboard side configured to face toward a centerline of a vehicle chassis; and a trigger located at the inboard side of the beam at the bending point and configured to cause the beam to bend at the bending point, the bending point located between the intermediate point of the beam and the second end of the beam.

20. The impact structure of claim 17, wherein the impact structure defines a plurality of chambers extending longitudinally between the first end and the second end, and wherein the reinforced section comprises at least one of a sleeve at least partially extending around the impact structure or a reinforcement ridge.

* * * * *